United States Patent
Hasegawa et al.

(10) Patent No.: US 10,727,659 B2
(45) Date of Patent: Jul. 28, 2020

(54) ELECTRIC JUNCTION BOX

(71) Applicant: YAZAKI CORPORATION, Tokyo (JP)

(72) Inventors: Hirotaka Hasegawa, Shizuoka (JP); Shinya Oishi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 50 days.

(21) Appl. No.: 15/970,823

(22) Filed: May 3, 2018

(65) Prior Publication Data
US 2018/0342860 A1  Nov. 29, 2018

(30) Foreign Application Priority Data
May 26, 2017  (JP) .................................. 2017-104655

(51) Int. Cl.
| | | |
|---|---|---|
| *H02G 3/16* | (2006.01) | |
| *H02G 3/08* | (2006.01) | |
| *H02G 3/14* | (2006.01) | |
| *B60R 16/023* | (2006.01) | |
| *H01R 13/516* | (2006.01) | |
| *H01H 85/20* | (2006.01) | |

(52) U.S. Cl.
CPC ........... *H02G 3/16* (2013.01); *B60R 16/0238* (2013.01); *H02G 3/081* (2013.01); *H02G 3/14* (2013.01); *H01H 85/2045* (2013.01); *H01R 13/516* (2013.01)

(58) Field of Classification Search
None
See application file for complete search history.

(56) References Cited

U.S. PATENT DOCUMENTS

| | | | | |
|---|---|---|---|---|
| 6,176,735 B1 * | 1/2001 | Kawaguchi | ......... | B60R 16/0238 439/298 |
| 7,717,720 B2 * | 5/2010 | Ikeda | ................... | H01H 50/048 439/701 |
| 9,583,928 B2 * | 2/2017 | Kawamura | .............. | H02G 3/18 |

(Continued)

FOREIGN PATENT DOCUMENTS

| | | |
|---|---|---|
| CN | 101662133 A | 3/2010 |
| JP | 8-223740 A | 8/1996 |

(Continued)

OTHER PUBLICATIONS

Japanese Office Action for the related Japanese Patent Application No. 2017-104655 dated Mar. 19, 2019.

*Primary Examiner* — Dimary S Lopez Cruz
(74) *Attorney, Agent, or Firm* — Kenealy Vaidya LLP

(57) ABSTRACT

An electric junction box includes a mounting portion into which an electric component is fitted and mounted. The mounting portion includes a holding wall, a locking hole and a pressing projection. The holding wall surrounds a peripheral surface of the electric component. The locking hole is formed in the holding wall and is locked to a locking projection provided on the peripheral surface of the electric component. The pressing projection protrudes from the holding wall to press and hold the peripheral surface of the electric component. The pressing projection is disposed at a position deviated from a movement path of the locking projection of the electric component to be fitted into the mounting portion.

6 Claims, 5 Drawing Sheets

(56) References Cited

U.S. PATENT DOCUMENTS

| | | | |
|---|---|---|---|
| 9,698,525 B2* | 7/2017 | Jaeger | H01R 13/6275 |
| 9,924,606 B2* | 3/2018 | Tsubouchi | H01B 7/0045 |
| 2007/0010123 A1 | 1/2007 | Ikeda | |
| 2010/0055962 A1* | 3/2010 | Ikeda | H01H 50/048 |
| | | | 439/345 |
| 2010/0173513 A1* | 7/2010 | Bergner | H01R 13/6271 |
| | | | 439/350 |

FOREIGN PATENT DOCUMENTS

| | | |
|---|---|---|
| JP | 2007-20357 A | 1/2007 |
| JP | 5221255 B2 | 6/2013 |

* cited by examiner

ELECTRIC JUNCTION BOX

CROSS REFERENCE TO RELATED APPLICATIONS

This application is based on Japanese Patent Application (No. 2017-104655) filed on May 26, 2017, the contents of which are incorporated herein by way of reference.

BACKGROUND

The present invention relates to an electric junction box.

In vehicles such as automobiles, an electric junction box is mounted to distribute electric power to various electric components. The electric junction box includes a resin case, and electric components such as relays or fuses are fitted and mounted into a cylindrical portion formed in the case (see, for example, Japanese Patent No. 5221255).

SUMMARY

An electric junction box according to the invention is characterized by the following configurations (1) to (5).

(1) An electric junction box including:
   a mounting portion into which an electric component is fitted and mounted, wherein
   the mounting portion includes
   a holding wall that surrounds a peripheral surface of the electric component,
   a locking hole that is formed in the holding wall and is locked to a locking projection provided on the peripheral surface of the electric component, and
   a pressing projection that protrudes from the holding wall to press and hold the peripheral surface of the electric component, and
   the pressing projection is disposed at a position deviated from a movement path of the locking projection of the electric component to be fitted into the mounting portion.

(2) The electric junction box according to (1), wherein
   the position of the pressing projection is deviated from the movement path in a direction orthogonal to the movement path.

(3) The electric junction box according to (1) or (2), wherein
   the mounting portion includes a holding projection that protrudes from the holding wall to press and hold the peripheral surface of the electric component, and
   the holding projection is disposed on a front side in a mounting direction of the electric component to the mounting portion rather than the locking hole.

(4) The electric junction box according to any one of (1) to (3), wherein
   the holding wall includes a pair of longer walls facing to each other and a pair of shorter walls facing to each other, to form a rectangular shape, and
   the locking hole and the pressing projection are provided in each of the shorter walls.

(5) The electric junction box according to (4), wherein
   the pressing projection is further provided in each of the longer walls.

DETAILED DESCRIPTION OF EXEMPLIFIED EMBODIMENTS

In the cylindrical portion of the electric junction box, a projection is provided to press and hold an outer peripheral surface of the electric component and to retain the electric component by being locked to a locking projection formed on the outer peripheral surface of the electric component. The projection is provided on an elastically deformable arm portion formed on a wall of the cylindrical portion. When coming in contact with the locking projection of the electric component to be fitted into the cylindrical portion, the arm portion elastically deforms, and thus an insertion force of the electric component is reduced.

In the structure in which the projection is formed on the elastically deformable arm portion, however, since the arm portion elastically deforms, the locking of the locking projection by the projection is inadvertently released with ease. In addition, a pressing force of the electric component by the projection weakens, and sufficient vibration resistance is hard be ensured at the time of traveling of the vehicle, for example. Further, due to formation of the elastically deformable arm portion, a shape is complicated, resulting in an increase in cost.

The invention has been made in view of the above circumstances, and an object thereof is to provide an electric junction box in which electric components can be easily mounted together with reduction in cost, and furthermore, the electric components can be reliably retain and held, whereby vibration resistance can be improved.

An embodiment of the invention will be described with reference to the drawings.

Figure 1:
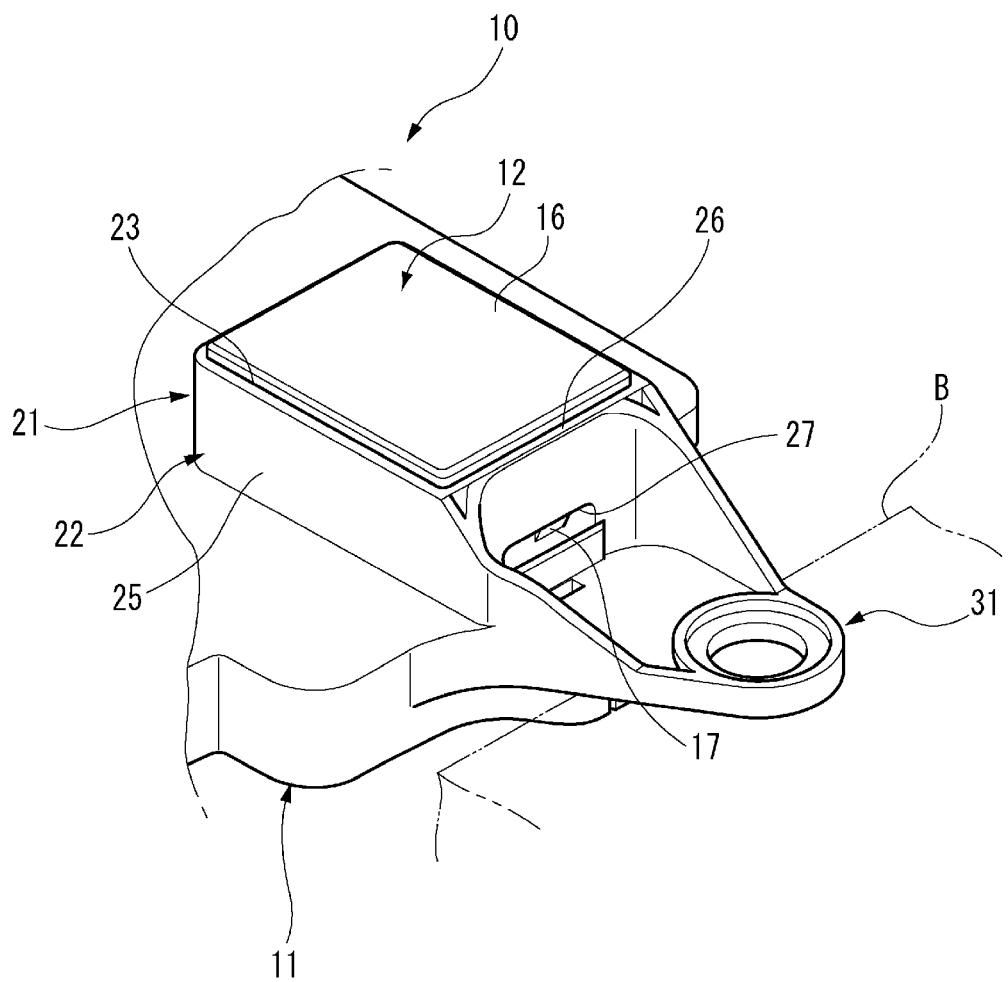
FIG. 1 is a perspective view of a part of an electric junction box according to an embodiment.

FIG. 1 is a perspective view of a part of an electric junction box according to the embodiment.

As illustrated in FIG. 1, an electric junction box 10 according to the embodiment includes a resin case 11. The electric junction box 10 is mounted on a vehicle in order to distribute electric power to various electric components of the vehicle such as an automobile. The electric junction box 10 is connected to various electric components of the vehicle via a wire harness (not illustrated).

The case 11 of the electric junction box 10 includes a housing space therein, and the housing space houses wiring members (not illustrated) such as circuit boards or bus bars, and electric components such as relays, fuses, or electric control units.

The case 11 includes a mounting portion 21 on an upper surface thereof. The mounting portion 21 is mounted with an external electric component 12 such as a relay or a fuse.

In addition, the case 11 includes a fixing portion 31 on a part of its peripheral edge. The fixing portion 31 is fastened to a bracket (a portion to be fixed) B provided on the body of the vehicle, by bolts or the like. The case 11 is fixed to the body of the vehicle by fastening of the fixing portion 31 with the bolts or the like.

Figure 2:
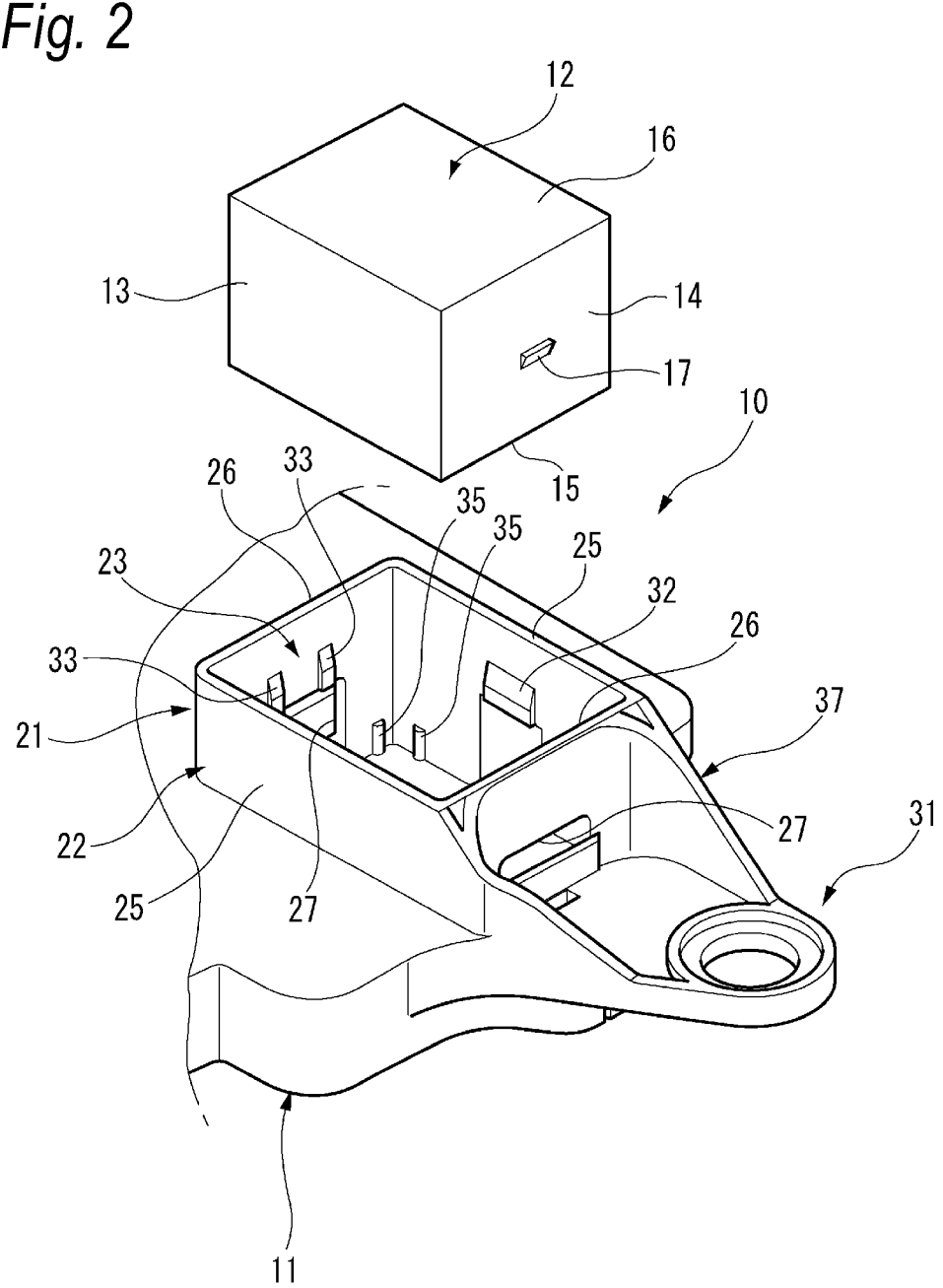
FIG. 2 is a perspective view of a part of the electric junction box according to the embodiment before electric components are mounted.
Figure 3:
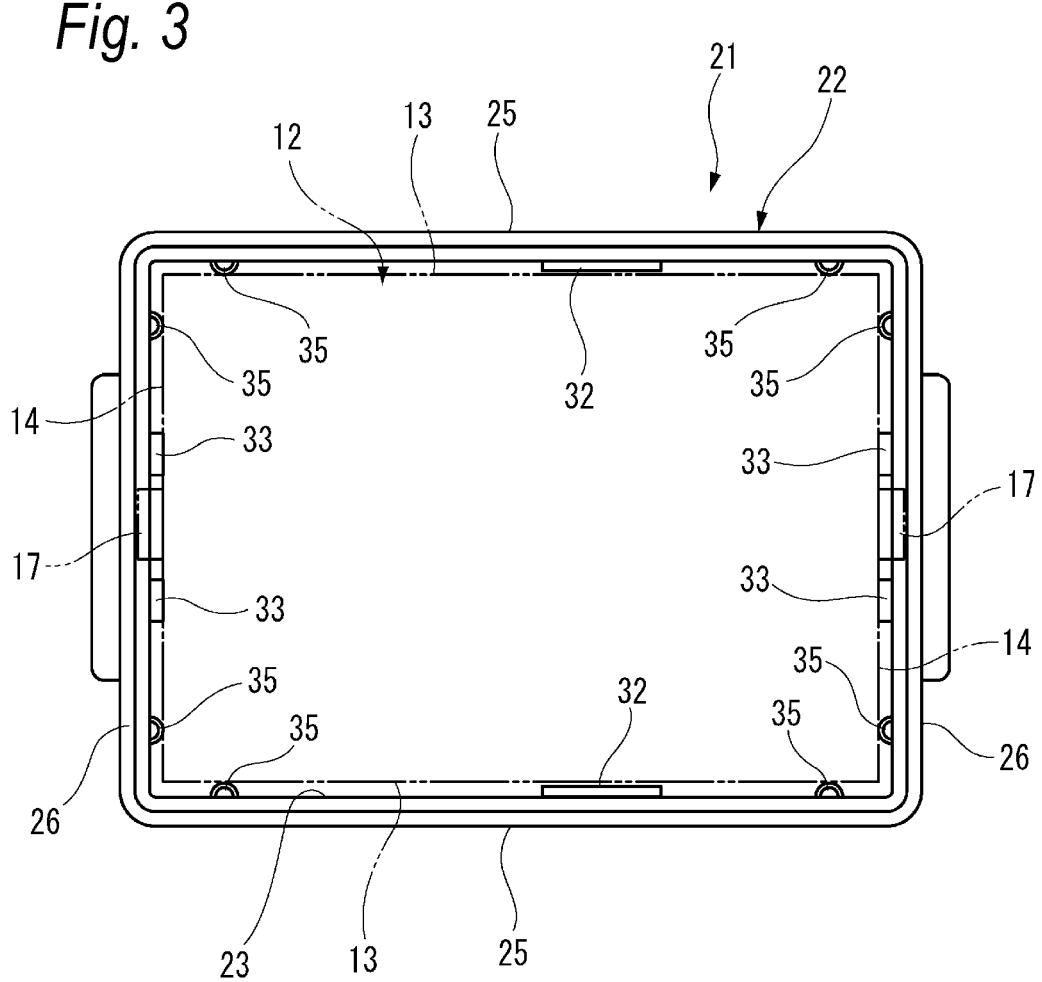
FIG. 3 is a plan view of a mounting portion to which the electric components are mounted.

FIG. 2 is a perspective view of the electric junction box according to the embodiment before the electric components are mounted. FIG. 3 is a plan view of the mounting portion to which the electric components are mounted.

As illustrated in FIGS. 2 and 3, the mounting portion 21 includes a holding wall 22, and an inside of the holding wall 22 serves as a fitting portion 23. The holding wall 22 is formed in a rectangular shape in plan view. The holding wall 22 includes a pair of long side walls 25 located opposite to each other and a pair of short side walls 26 located opposite to each other in like manner, and the long side walls 25 and the short side walls 26 are connected to each other.

The electric component 12 is fitted into the fitting portion 23 of the mounting portion 21 from above. The electric component 12 is formed in a box shape having a pair of side faces 13, a pair of end faces 14, a bottom 15, and a top 16. The holding wall 22 supports a peripheral surface of the electric component 12 fitted into the fitting portion 23. The electric component 12 includes a terminal (not illustrated) on the bottom 15, and the terminal protruding from the bottom is electrically connected to the wiring member such as a bus bar inside the case 11 when the electric component 12 is fitted into the fitting portion 23. A locking projection 17 is formed on the end face 14 of the electric component 12. The locking projection 17 is formed substantially at a center of the end face 14.

The holding wall 22 of the mounting portion 21 includes a locking hole 27 formed in the short side wall 26. The locking projection 17 of the end face 14 of the electric component 12 enters into the locking hole 27. The locking projection 17 of the electric component 12 is prevented from coming off by being locked to the edge of the locking hole 27, thereby being held in a state of being fitted into the fitting portion 23 of the mounting portion 21.

A pressing projection 32 protruding inward is formed on the long side wall 25 of the holding wall 22. The pressing projection 32 comes in contact with the side face 13 of the electric component 12 fitted into the fitting portion 23 of the mounting portion 21. Similarly, a pressing projection 33 protruding inward is formed on the short side wall 26 of the holding wall 22. The pressing projection 33 comes in contact with the end face 14 of the electric component 12 fitted into the fitting portion 23 of the mounting portion 21. The pressing projection 32 abuts against the side face 13 of the electric component 12, the pressing projection 33 abuts against the end face 14, and thus the electric component 12 is reliably held in the holding wall 22.

Figure 4:
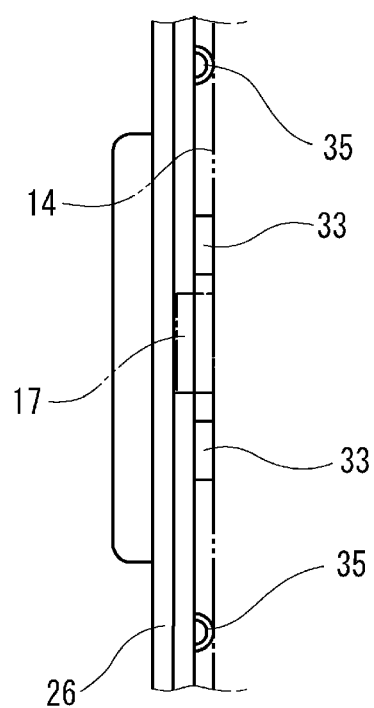
FIG. 4 is a plan view of a part of the mounting portion to which the electric components are mounted.

FIG. 4 is a plan view of a part of the mounting portion to which the electric components are mounted.

As illustrated in FIG. 4, a plurality of pressing projections 33 are formed on the short side wall 26. These pressing projections 33 are disposed at positions deviated from the movement path of the locking projection 17 formed on the end face 14 of the electric component 12 fitted into the fitting portion 23. Specifically, these pressing projections 33 are disposed on both sides, which are directions orthogonal to the movement path of the locking projection 17 when the electric component 12 is fitted into the fitting portion 23. The locking projection 17 of the electric component 12 passes between the pressing projections 33 without interference with the pressing projection 33 and enters into the locking hole 27 when the electric component 12 is fitted into the fitting portion 23.

The holding wall 22 includes a plurality of holding projections 35 protruding inward from the long side wall 25 and the short side wall 26 in a vicinity of a lower end, which is a front side in a mounting direction of the electric component 12 to the mounting portion, rather than the locking hole 27. These holding projections 35 come in contact with vicinities of the lower end of the side face 13 and the end face 14 of the electric component 12 fitted into the fitting portion 23 of the mounting portion 21. The vicinity of the lower end of the electric component 12 is held by the holding projection 35 which comes in contact with the vicinity of the lower end of the side face 13 and the end face 14.

As described above, according to the electric junction box 10 of the embodiment, when the electric component 12 is fitted into the mounting portion 21, the locking projection 17 of the electric component 12 can enter into the locking hole 27 without interference with the pressing projection 33.

An electric junction box according to a reference example will be described below.

Figure 5:
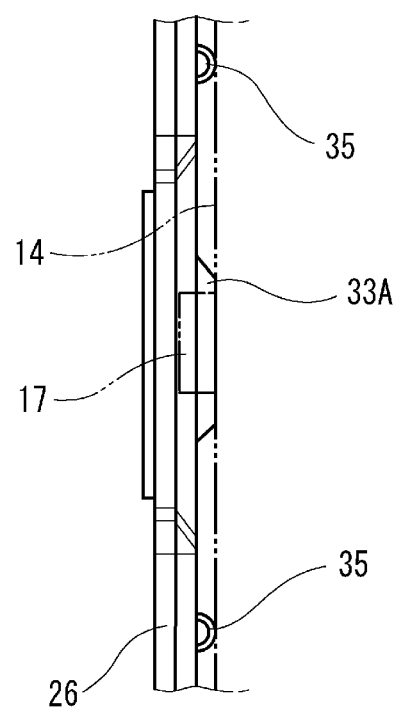
FIG. 5 is a plan view of a part of a mounting portion to which electric components are mounted for the purpose of a reference example.

FIG. 5 is a plan view of a part of a mounting portion to which electric components are mounted for the purpose of describing the reference example.

As illustrated in FIG. 5, in the electric junction box according to the reference example, one pressing projection 33A is formed substantially at a center in a width direction of a short side wall 26 of a holding wall 22, and the pressing projection 33A is disposed on the movement path of a locking projection 17 of an electric component 12 to be fitted into a mounting portion 21.

In the electric junction box, when the electric component 12 is fitted into the mounting portion 21, the locking projection 17 of the electric component 12 interferes with the pressing projection 33A and the pressing projection 33A is pushed outward. In such a structure, when the locking projection 17 gets over the pressing projection 33A, an excessive force acts on the holding wall 22 and a large insertion force is required.

On the contrary, according to the embodiment, an excessive force does not act on the holding wall 22, and the electric component 12 can be mounted onto the mounting portion 21 with a low insertion force. That is, the electric component 12 can be easily mounted, and furthermore, the electric component 12 can be reliably prevented from coming off and can be reliably held, whereby vibration resistance can be improved. Further, as compared with a structure having an elastically deformable arm portion, it is possible to reduce costs with simplification of a structure.

In addition, the pressing projection 33 is disposed at a position deviated in the direction orthogonal to the movement path of the locking projection 17 of the electric component 12 to be fitted into the mounting portion 21. Accordingly, when the electric component 12 is fitted into the mounting portion 21, the locking projection 17 of the electric component 12 is caused to pass forward of the position of the pressing projection 33 in the mounting direction without interference with the pressing projection 33 and can enter into the locking hole 27. With such a structure, the electric component 12 can be pressed from the surrounds by the pressing projection 33 on the rear side in the mounting direction rather than the locking position of the locking projection 17 to the locking hole 27, and the electric component 12 can be held in a stable state.

In addition, the holding wall 22 includes the holding projections 35, which press and hold the side face 13 and the end face 14 of the electric component 12, on the front side in the mounting direction of the electric component 12 to the mounting portion 21 rather than the locking hole 27. Accordingly, the holding projection 35 pressed the electric component 12 from the surroundings on the front side in the mounting direction with respect to the locking position between the locking hole 27 and the locking projection 17 in the electric component 12. With such a structure, the electric component 12 can be held in a more stable state.

It is to be noted that the invention is not limited to the above-described embodiment, but can be appropriately modified, improved, and the like. In addition, the materials, shapes, dimensions, numbers, locations, and so forth, of the components of the above-described embodiments are optionally selectable as long as the present invention can be carried out, and are not restricted.

The features of the embodiment of the electric junction box according to the invention described above are briefly summarized and listed in the following [1] to [5], respectively.

[1] An electric junction box (10) including a mounting portion (21) into which an electric component (12) is fitted and mounted, wherein,
  the mounting portion (21) includes
    a holding wall (22) that surrounds a peripheral surface of the electric component (12),
    a locking hole (27) that is formed in the holding wall (22) and is locked to a locking projection (17) provided on the peripheral surface (end face 14) of the electric component (12), and
    a pressing projection (33) that protrudes from the holding wall (22) to press and hold the peripheral surface (side face 13, end face 14) of the electric component (12), and
  the pressing projection (33) is disposed at a position deviated from a movement path of the locking projection (17) of the electric component (12) to be fitted into the mounting portion (21).

[2] The electric junction box according to [1] described above, wherein the position of the pressing projection (33) is deviated from the movement path in a direction orthogonal to the movement path.

[3] The electric junction box according to [1] or [2] described above, wherein the mounting portion (21) includes a holding projection (35) that protrudes from the holding wall (22) to press and hold the peripheral surface (side face 13, end face 14) of the electric component (12), and
  the holding projection (35) is disposed on a front side in a mounting direction of the electric component (12) to the mounting portion (21) rather than the locking hole.

[4] The electric junction box according to any one of [1] to [3], wherein the holding wall (22) includes a pair of longer walls (25) facing to each other and a pair of shorter walls (26) facing to each other, to form a rectangular shape, and
  the locking hole (27) and the pressing projection (33) are provided in each of the shorter walls (26).

[5] The electric junction box according to [4], wherein the pressing projection (33) is further provided in each of the longer walls (25).

According to the electric junction box of the above-described configuration, when the electric component is fitted into the mounting portion, the locking projection of the electric component enters into the locking hole without interference with the pressing projection. With such a structure, an excessive force does not act on the holding wall and the electric component can be mounted with a low insertion force. In addition, as compared with a structure having an elastically deformable arm portion, it is possible to reduce costs with simplification of a structure. That is, it is possible to easily mount the electric component while reducing costs, and furthermore, it is possible to reliably easily retain and hold the electric component, thereby improving vibration resistance.

According to the electric junction box of the above-described configuration, when the electric component is fitted into the mounting portion, the locking projection of the electric component is caused to pass forward of the position of the pressing projection in the mounting direction without interference with the pressing projection and can enter into the locking hole. With such a structure, the electric component can be pressed from the surrounds by the pressing projection on the rear side in the mounting direction rather than the locking position of the locking projection to the locking hole, and the electric component can be held in a stable state.

According to the electric junction box of the above-described configuration, the holding projection pressed the electric component 12 from the surroundings on the front side in the mounting direction with respect to the locking position between the locking hole and the locking projection in the electric component. With such a structure, the electric component can be held in a more stable state.

According to the invention, it is possible to the electric junction box in which electric components can be easily mounted together with reduction in cost, and furthermore, the electric components can be reliably retain and held, whereby vibration resistance can be improved.

What is claimed is:

1. An electric junction box comprising:
  a mounting portion into which an electric component is fitted and mounted, wherein
  the mounting portion includes
  a holding wall that surrounds a peripheral surface of the electric component,
  a locking hole that is formed in a continuous part of the holding wall and is locked to a locking projection provided on the peripheral surface of the electric component such that the locking projection is prevented from coming off the holding wall, and
  a plurality of pressing projections that protrude from the continuous part of the holding wall to press and hold the peripheral surface of the electric component,
  wherein the plurality of pressing projections are disposed on both sides of the locking projection in a direction orthogonal to a movement path of the locking projection of the electric component to be fitted into the mounting portion, and are disposed on an edge of the locking hole locked to the locking projection.

2. The electric junction box according to claim 1, wherein the position of the plurality pressing projections is deviated from the movement path in a direction orthogonal to the movement path.

3. The electric junction box according to claim 1, wherein the mounting portion includes a holding projection that protrudes from the holding wall to press and hold the peripheral surface of the electric component, and
  the holding projection is disposed on a front side in a mounting direction of the electric component to the mounting portion rather than the locking hole.

4. The electric junction box according to claim 1, wherein the holding wall includes a pair of longer walls facing to each other and a pair of shorter walls facing to each other, to form a rectangular shape, and
  the locking hole and the plurality pressing projections are provided in each of the shorter walls.

5. The electric junction box according to claim 4, wherein the plurality pressing projections is further provided in each of the longer walls.

6. The electric junction box according to claim 1, wherein when the electric component is fitted and mounted into the mounting portion, a force is transmitted by the locking projection to act on the holding wall.

\* \* \* \* \*